United States Patent [19]

Shibano

[11] Patent Number: 4,827,488
[45] Date of Patent: May 2, 1989

[54] DEMODULATOR FOR PSK-MODULATED SIGNALS

[75] Inventor: Yoshizo Shibano, Osaka, Japan

[73] Assignee: Sumitomo Electric Industries Ltd., Osaka, Japan

[21] Appl. No.: 93,633

[22] Filed: Sep. 8, 1987

[30] Foreign Application Priority Data

Sep. 10, 1986 [JP] Japan .................................. 61-213611

[51] Int. Cl.$^4$ .......................................... H04L 27/22
[52] U.S. Cl. ........................................ 375/82; 375/83; 375/97; 329/122
[58] Field of Search ........................ 375/80, 81, 82, 83, 375/120, 97; 331/1 A, 1 R; 329/110, 122; 455/205, 208

[56] References Cited

U.S. PATENT DOCUMENTS

| | | | |
|---|---|---|---|
| 4,030,045 | 6/1977 | Clark | 329/122 |
| 4,291,332 | 9/1981 | Kato et al. | 375/120 |
| 4,316,152 | 2/1982 | Meyer | 331/1 A |
| 4,445,224 | 4/1984 | Ihira et al. | 307/516 |
| 4,475,216 | 10/1984 | Noguchi | 375/81 |
| 4,574,244 | 3/1986 | Head | 375/120 |
| 4,591,730 | 5/1986 | Pennoni | 375/120 |
| 4,591,797 | 5/1986 | Tanimoto et al. | 375/81 |
| 4,644,420 | 2/1987 | Buchan | 375/120 |
| 4,679,003 | 7/1987 | Sagawa et al. | 375/120 |
| 4,680,780 | 7/1981 | Agoston et al. | 375/81 |

Primary Examiner—Benedict V. Safourek
Assistant Examiner—Stephen Chin
Attorney, Agent, or Firm—Stevens, Davis, Miller & Mosher

[57] ABSTRACT

A demodulator is disclosed for a PSK-modulated transmission signal in which the time average value of the frequencies thereof ar equal to the carrier frequency. A mixer receives and mixes the PSK-modulated transmission signal with a signal from a local variable frequency oscillator and the output thereof is converted to a square wave which is used to reconstruct the original digital modulation data. A pulse counter receives and counts the square wave signal for every period of time which is n times a time slot of a digital signal and a subtractor provides a difference between the count value from the pulse counter and a reference count number. The subtractor output is converted to an analog signal which controls the local oscillator frequency.

7 Claims, 3 Drawing Sheets

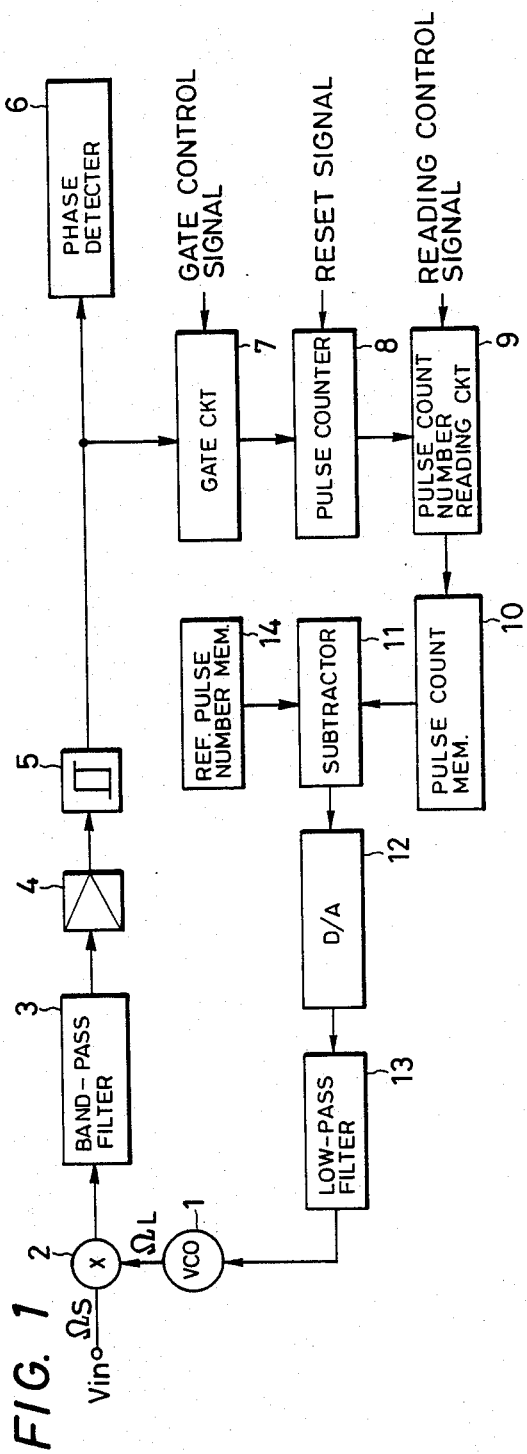
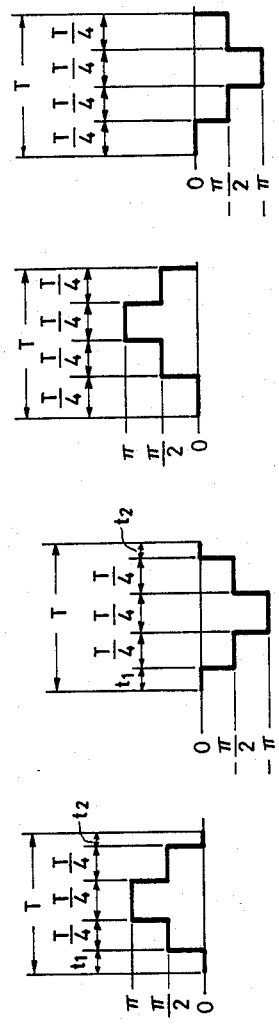
FIG. 1
FIG. 2(A)  FIG. 2(B)  FIG. 2(C)  FIG. 2(D)

FIG. 4(E)
FIG. 4(D)
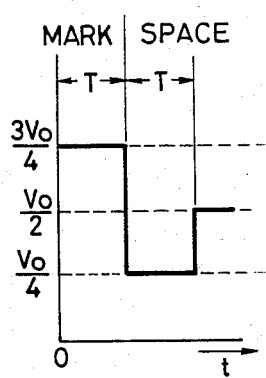
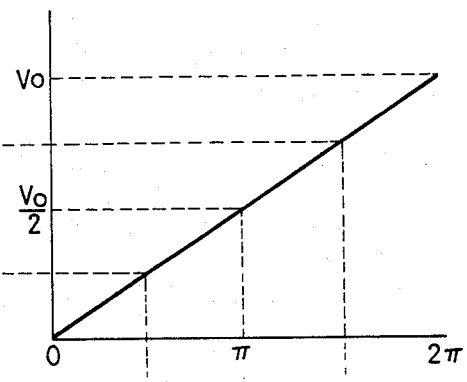
FIG. 4(B)  FIG. 4(A)
FIG. 4(C)
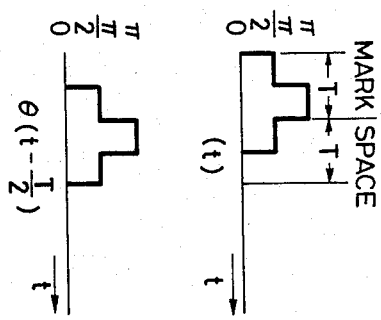
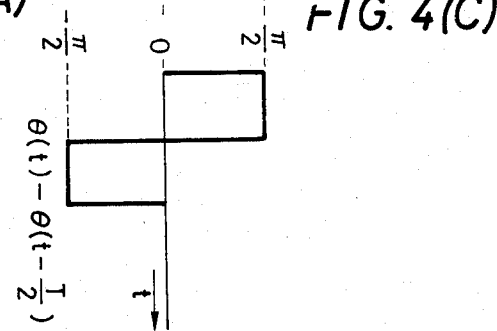
FIG. 5
FIG. 6
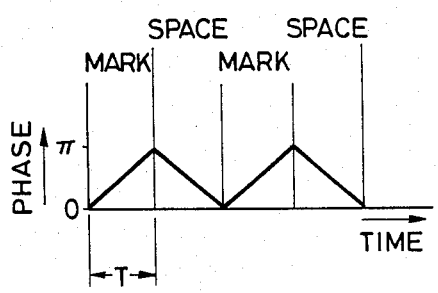
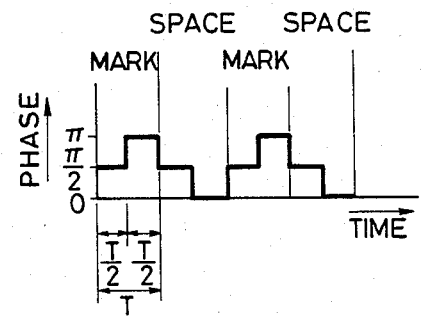

DEMODULATOR FOR PSK-MODULATED SIGNALS

BACKGROUND OF THE INVENTION

1. Field of the Invention

This invention relates to demodulators, and more particularly to a novel demodulator for a signal which is phase-modulated so that the time average of its frequency is equal to a carrier frequency. The signal is converted into an intermediate frequency signal to keep the intermediate frequency stabilized and to permit easy demodulated to the original digital signal.

2. Description of the Art

So far, the PSK (phase shift keying) modulation system, in which a digital signal is transmitted with the bits "0" and "1" in correspondense to the phases of the carrier, is extensively employed for transmission of digital signals, because of its good characteristics to noise.

The PSK modulation system will be described in more detail.

There are a lot of PSK modulation techniques. On of them which is frequently used is MSK modulation. In MSK modulation, the phase of a carrier is linearly increased by 180° for one time slot of the signal when a digital signal is in a "mark" state, and the phase is linearly decreased by 180° for one time slot of the signal when a digital signal is in a "space" state.

Another modulation technique is a so-called "DSK" technique, in which, as shown in FIG. 6, one time slot is divided into two equal parts and the phase of a carrier is increased by two steps, namely 90° each, for the one time slot for a "mark" state of a digital signal, the phase is decreased also by two steps, 90° each, for a "space" state of a digital signal.

The MSK system is advantageous in that, as the phase is changed linearly, the occupied frequency bandwidth is narrow. The DSK system is advantageous in that it, having good characteristics under condition of multi-path fading, is suitable for wide-band and high speed data transmission.

There are two commonly used demodulation techniques for PSK-modulated signals, synchronous detection and delay detection.

In the delay detection, signals received are divided into two parts. One is supplied to a phase comparator after being delayed by appropriate time duration with a delay circuit, while the other is supplied to the phase comparator as it is, so as to demodulate the PSK-modulated signal thereby to obtain the origianl digital signal.

This will be described in more detail. It is assumed that, in a delay detector shown in FIG. 3(A), its input voltage Vin is represented by the following expression:

$$Vin = \cos(\Omega t + \theta(t))$$

Where $\Omega$ is the angular frequency of a carrier, t is the time, and $\theta(t)$ is the phase modulation function. The input voltage Vin is divided into two ways parts. One of the two parts is applied to one input terminal of a phase comparator 22, while the other is applied to the other input terminal of the comparator 22 after being delayed by a predetermined period of time TR. Therefore, the signal Vc applied to the one input terminal is:

$$Vc = Vin = \cos(\Omega t + \theta(t))$$

and the signal Vd applied to the other input terminal is:

$$Vd = \cos(\Omega(t\ TR) + \theta(t - TR))$$

Where the phase comparator 22 is designed as shown in FIG. 3 (B) and provides an output proportional to a phase difference as shown in FIG. 3(C), the phase difference $\Delta\theta$ is:

$$\Delta\theta = TR + \theta(t) - \theta(t - TR)$$

The delay time TR should meet TR = T/2 (where T is one time slot of the signal) in the MSK system or DSK system.

With $\Omega\ TR = (2n - 1)$, namely with $\Omega = (2n - 1)\pi/TR = (2n - 1)2\pi/T$, the reference point for phase comparison can be set at the center of the range of operation of the phase comparator.

The operation of the DSK modulation will be described by way of example; however, it should be noted that the description is applicable to the MSK system as well.

In the case of $\theta(t) - \theta(t\ TR) = 0$,

The operation reference point of the phase comparator is expressed as $$\Delta\theta = \Omega TR - (2n - 1)\pi$$

Therefore, the output of the phase comparator will be the one corresponding to the operation point which is shifted as much as $\theta(t) - \theta(t - TR)$ from the reference point.

In the case where the signal is of "mark" followed by "space", the phase function $\theta(t)$ is as shown in FIG. 4 (A) and $\theta(t - T/2)$ is as shown in FIG. 4(B).

Accordingly, $\theta(t) - \theta(t - T/2)$, as shown in FIG. 4(C) is $\pi/2$ for a "mark" period and $-\pi/2$ for a "space" period, and an output waveform as shown in FIG. 4(E) is obtained according to an output characteristic as shown in FIG. 4(D). That is, the output is $3V_0/4$ for the "mark" period, and $V_0/4$ for the "space" period.

Accordingly, when the output of the phase comparator 22 exceeds $V_0/2$, the signal is judged as "mark". When the output is lower than $V_0/2$, the signal is in a "space" state.

On the other hand, when a synchronous detection circuit is used for demodulation, a signal received is divided into two parts, which are applied to two phase comparators, respectively. An output signal of a voltage-controlled oscillator in a phase locked loop(whose frequency is coincident with the carrier frequency of the signal received) is applied to one of the phase comparators, and the output signal is supplied to the other phase comparator with its phase shifted by 90°, so that the original digital signal is obtained from the output signals of the two phase comparators (cf.*Trans.IECE Japan*, Vol. 64-B, No. 10, 1981, GMSK Modulation System Transmission Characteristic by Kazuaki Murota and Kenkichi Hiraide).

In demodulating the PSK-modulated signal according to the above-described delay detection system, the signal received is divided into two parts, one of which is merely delayed. This has the advantage that the circuitry can be simplified. However, if this method is applied to the transmission of digital signals in a high frequency band, the demodulation reliability is lowered.

This will be described in more detail. In the delay detection system, the operating reference point is $\Delta\theta = \Omega T/2$. Therefore, if the carrier angular frequency drifts by $\Delta\Omega$, for instance, by a temperature change, then the operating reference point will be changed by $\Delta\Omega T/2$. If this change is large, then it is difficult to determine the "mark" and "space" according to whether or not the output level of the phase comparator exceeds $V_0/2$. For instance when the carrier frequency is 2.5 GHz, and the temperature variation of the oscillator (such as a saw tooth wave oscillator) is $\pm 3 \times 10^{-4}$, then the frequency variation will be of $\pm 750$ KHz. If, in this case, the data transmission speed is set to 32K bps, then $T = 1/32$ msec, and $\Delta\Omega T/2 = 23.44 \pi$; that is, the drift of the operating reference point is about substantially 23.44 $\pi$. In practice, the operating reference point, being affected by noise, and interference waves coming through multiple paths in addition to the temperature variation, is further shifted. Therefore, it is difficult to determine the "mark" and "space" through comparison of the output level of the phase comparator with a predetermined reference value.

The synchronous detection system described above is based on the reproduction of a carrier frequency by a COSTAS loop. In this system, unlike the phase delay detection system, the difficulty due to the frequency variation never takes place, and the signal can be demodulated with high accuracy.

However, the synchronous detection system has its own disadvantages. It is necessary to provide a voltage-controlled oscillator as a local oscillator and a phase locked loop to obtain the signal whose frequency is equal to the carrier frequency of a signal received. This requirement will make the circuitry intricate and increase the manufacturing cost. This problem is a serious matter especially for mobile radio equipment because of the requirement for a miniaturization and simplification of the mobile radio equipment and for a reduced manufacturing cost.

The present inventor has proposed (in Ser. No. 072,162 filed July 10, 1987, the disclosure of which is incorporated herein by reference) system in which the delay time is made equal to the total time of reference phase parts of PSK-modulation signal according to an NRZ signal obtained after demodulation of the modulated signal in order to reduce the total time of the reference phase parts, and the variation $\Delta\theta\Delta T$ of the operating reference point is thereby decreased to improve stability.

While this proposal is advantageous, if it is employed in a system where high frequencies are used for carrier frequencies, the improvement in stability is limited, and the degree of technical difficulty is increased.

This will be described in more detail. If the total time of the reference phase parts is decreased, then the rate of variation of phase to time is increased, and the occupied frequency band width of the modulation wave is increased. Furthermore, steep pulse waves must be handled in the signal (e.g. video) processing stage after detection; that is, high frequency components must be processed. This increases the degree of technical difficulty and increases costs.

The inventor has also proposed (in Ser. No. 076,173 filed July 21, 1987, the disclosure of which is incorporated herein by reference) two other PSK modem systems in which demodulation is based on the time average of the instantaneous angular frequencies of two respective kinds of PSK modulation waves. In one of the other systems, the PSK modulation wave has reference phase parts whose total time is a predetermined value provided at the front and/or rear part of one time slot of a digital pulse signal, and in the front half of the remaining part of the time slot, the phase is changed in a predetermined direction in correspondence to one of the "mark" and "space" states of a transmission signal, and in the rear half, the phase is restored to the reference phase. For the other state of the transmission signal the phase changes in the opposite direction front that for the one state. In the second one of the other systems a PSK modulation wave is used in which the phase of the transmission signal for one of the "mark" and "space" states is as described above for the first system; however, only the reference phase part is formed over the entire range of one time slot of the digital pulse signal in correspondence to the other state of the transmission signal. In such systems the time average of the instantaneous angular frequencies is equal to the carrier angular frequency. A local oscillation frequency to be mixed with the received signal is feedback-controlled by the utilization of a signal which is obtained by subjecting an intermediate frequency signal to frequency detection, thereby to stabilize the carrier wave angular frequency of the intermediate frequency signal, and the signal received is demodulated by the utilization of the signal thus stabilized.

In such systems, a detector having a linear frequency response is, in general, employed as a frequency detector for subjecting the intermediate frequency signal to frequency detection. The linear detector, being made up of analog circuits, has a relatively large fluctuation characteristic. Accordingly, it is essential to adjust each of the demodulators to allow the latter to operate as required. Especially in a mass production of the demodulators, the time and labor required for such adjustment will increase the manufacturing cost.

SUMMARY AND OBJECTS AND ADVANTAGES OF THE INVENTION

In view of the foregoing, an object of this invention is to provide a demodulator for demodulating with high accuracy a signal which is PSK-modulated according to either of the above-described other PSK modem systems.

Another object of the invention is to provide a demodulator for demodulating a signal which is PSK-modulated according to the above-described other PSK modem systems which has a simplified construction and which has no need for adjustment during manufacture.

The foregoing objects of the invention have been achieved by the provision of a demodulator which comprises: a mixer receiving: (1) a signal which is phase-modulated such that a time average value of frequencies thereof are equal to a carrier frequency thereof, and (2) an output signal of a variable frequency local oscillator; a waveform conversion circuit for subjecting an intermediate frequency signal of the mixer to waveform conversion to obtain a square wave signal; a pulse counter for counting the square wave signal every period which is N times a time slot of a digital pulse signal (where N is an integer or a sufficiently large number other than an integer); a subtraction circuit for receiving a count number from the pulse counter to provide a difference signal between the count number and a reference count number $n f_0 T$ (where $f_0$ is the reference intermediate frequency band carrier frequency, and T is the time slot of the signal); a digital to analog (D/A) converter for converting the difference signal from the subtraction circuit into an analog signal which is supplied to the variable frequency local oscillator; and a restoring circuit which receives the square wave signal and restores it to a predetermined digital signal.

The above-described modulated signal which is so phase-modulated that the time average value of frequencies are equal to the carrier frequency may be of the type which is phase-modulated in such a manner that reference phase parts of predetermined total time are provided at the front and/or rear part of a time slot of a digital pulse signal, and in the front half of the remaining part of the time slot, the phase thereof is changed in a predetermined direction in correspondence to one of "mark" and "space" states of a transmission signal, while in the rear half of the remaining part, the phase thus changed is returned to a reference value, and wherein the phase is further changed in a direction opposite to the predetermined direction for the other state. Alternatively, the modulated signal may be so phase-modulated that reference phase parts of predetermined total time are provided at the front and/or rear part of a time slot of a digital pulse signal, and in the front half of the remaining part of the time slot, the phase thereof is changed in a predetermined direction in correspondence to one of "mark" and "space" states of a transmission signal, while in the rear half of the remaining part, the phase thus changed is returned to a reference value, and wherein the phase is maintained at the reference value for the other state.

The restoring circuit may be, for example, a phase detection circuit, although this is not limitative of the invention.

The intermediate frequency is converted into a square wave signal, the pulses are counted for a predetermined period of time, and the resultant count value is divided by the counting time. Therefore, the carrier frequency of the intermediate frequency signal can be stabilized by controlling the variable frequency local oscillator according to the difference signal which is produced by the difference between the count number and the reference count number, instead of using an analog type frequency detector. Accordingly, the carrier frequency of the intermediate frequency signal can be stabilized merely by setting the reference count value. Thus, an adjustment operation which is required in the case of an analog type frequency detector can be eliminated according to the invention.

BRIEF DESCRIPTION OF THE DRAWINGS

The above and other objects, advantages and features of the invention will be more readily understood from the following detailed description of tee invention which is provided /in connection with the accompanying drawings wherein:

FIG. 1 is a circuit diagram showing essential parts of one example of a demodulator according to this invention.

FIGS. 2A-2D are diagrams for a modulation signal which may be demodulated by the demodulator.

FIGS. 4A-4E are diagrams for the operation of the conventional delay detector shown in FIG. 3.

FIGS. 5 and 6 are diagrams for a description of conventional PSK modulation systems.

DETAILED DESCRIPTION OF THE INVENTION

Figure 3A:
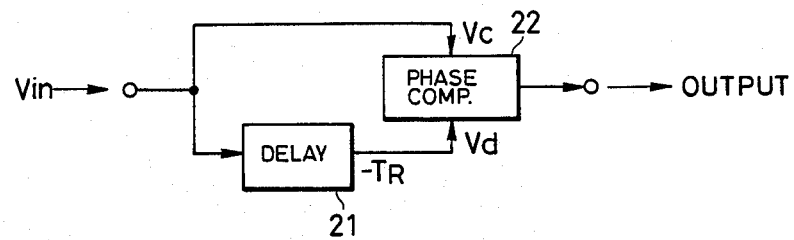
FIG. 3A-3C are diagrams for a conventional delay detector.

One embodiment of the demodulation of this invention will now be described with reference to the accompanying drawings.

FIG. 2 shows examples of a modulation signal which is to be demodulated. In FIGS. 2(A) and (B), reference phase parts having periods of time t1 and t2 are provided respectively before and after a phase change part of a transmission signal, and the following relationship holds $t_1 + t_2 = \Delta T$ where $\Delta T$ is a predetermined period of time shorter than one time slot T of a digital signal. In the remaining part of the time slot, in the case of a "mark", as shown in FIG. 1(A) the phase is changed to a predetermined value $\theta(\theta = n$ in FIG. 2)in the beginning of the remaining part, and to zero (0) at the end; and in the case of a "space", as shown in FIG. 2(B) the phase is changed, in the opposite direction, to $-\theta$ and 0.

FIGS. 2(C) and (D) show the case where $t_1 = \Delta T$, and $t_2 = 0$. The phase change in the remaining part of the time slot is the same as that in the case of FIGS. 2(A) and (B).

It should be noted that the phase characteristics of FIGS. 2(A) and (B) are equal to those of FIGS. 2(C) and (D). That is, the phase characteristic is maintained unchanged as long as $t_1 + t_2 = \Delta T$ is satisfied, as will become more apparent later. Therefore, only the signal of FIGS. 2(C) and (D) will be described, with delay time R set to $\Delta T$.

FIG. 2 (C) shows a "mark" signal in which the phase $\theta_0$ with $0 \leq t > \Delta T (\theta_0 = 0$ in the figure), $\theta_0 + g(t - \Delta t)$ with $\Delta T \leq t > \Delta T + T'/2$, $\theta_0 + g$ (T−t) With $\Delta T + T'/2 \leq t < T$.

FIG. 2 (D) shows a "space" signal in which the phase $\theta(t)$ is $\theta_0$ with $0 \leq t > \Delta T$, $\theta_0 - g(t - \Delta T)$ with $\Delta T \leq t < \Delta T + T'/2$, and $\theta_0 - g(T-t)$ with $\Delta T + T'/2 \leq t < T$.

In these expressions, g(t) is the phase change function, and T'/2 is the time which is a half ($\frac{1}{2}$) of the time of the part other than the reference phase part.

FIG. 1 is a block diagram showing essential parts of one example of a demodulator according to this invention. In FIG. 1, a signal received (having an angular frequency of $\Omega$) is supplied to a mixer 2 which receives a local oscillation signal (having an angular frequency of $\Omega$) from a local oscillator, namely, a voltage-controlled oscillator (hereinafter referred to as "a VCO") 1. The output signal of the mixer 2 is supplied through a bandpass filter 3 and an amplifier 4 to a Schmitt trigger circuit 5, the output of which is applied to a phase detection circuit 6. A part of the output signal from the Schmitt trigger circuit 5 is applied through a gate circuit 7 to a pulse counter 8, the output of which is supplied through a pulse count number reading circuit 9 and a pulse count number memory 10 to a subtraction circuit 11. The output difference signal of the subtraction circuit is applied through a D/A (digital-to-analog) converter 12 and a low-pass filter 13 to the VCO 1. A reference pulse signal provided by a reference pulse number memory 14 is also supplied to the subtraction circuit 11. A gate control signal corresponding to a period which is an integer n times a time slot of a digital pulse signal is applied to the gate circuit 7. A reset signal is supplied to the pulse counter every period which is an integer n times the time slot of the digital pulse signal. A read control signal is applied to the pulse count number reading circuit 9 in correspondence to the reset signal supplied to pulse counter 8.

The demodulator thus constructed operates as follows.

In general, a PSK modulation wave having the phase variation characteristic as shown in FIG. 2 is represented by the following expression:

$$e(t) = \cos(\Omega t + \theta(t))$$

The instantaneous angular frequency of the PSK modulation wave is:

$$\omega(t) = d/dt \{(\Omega t + \theta(t))\} = \Omega + \theta'(t)$$

Therefore, in the case of a "mark" signal, the instantaneous angular frequency is:
$\Omega(t) = \Omega$ for a period of time defined by $0 \leq t < \Delta T$;
$\Omega(t) = \Omega + g'(t - \Delta T)$ for a period of time defined by $\Delta T \leq t < \Delta T + T'/2$; and
$\omega(t) = \Omega - g'(T - t)$ for a period of time defined by $\Delta T + T'/2 \leq t < T$.

In the case of a "space" signal, the instantaneous angular frequency is:
$\omega(t) = \Omega$ for a period of time defined by $0 \leq t < \Delta T$;
$\omega(t) = \Omega - g'(t - \Delta T)$ for a period of time defined by $\Delta T + T'/2 \leq t < T$.

In the case of the "mark" signal, the average value of the instantaneous angular frequencies in a time slot is:

$$\begin{aligned}
\bar{\omega} &= (1 + T) \int_0^T \omega(t)dt \\
&= (1 + T)\left\{ \int_0^{\Delta T} \omega(t)dt + \int_{\Delta T}^{\Delta T + T/2} \omega(t)dt + \int_{\Delta T + T/2}^{T} \omega(t)dt \right\} \\
&= (1/T)[\Omega T + \{g(T/2) - g(0)\} + \{g(0) - g(T/2)\}] \\
&= \Omega
\end{aligned}$$

In the case of the "space" signal, the average value of the instantaneous angular frequencies in a time slot is also $\Omega$.

The time average value of the instantaneous angular frequencies of the PSK modulation wave is always equal to the angular frequency $\Omega$ of the carrier wave irrespective of the contents of the signal. This is unique because in the conventional PSK modulation wave the time average value of the instantaneous angular frequencies is not always equal to the angular frequency of the carrier wave.

Now, the operation of the demodulator under the above-described conditions will be described.

Figure 3B:
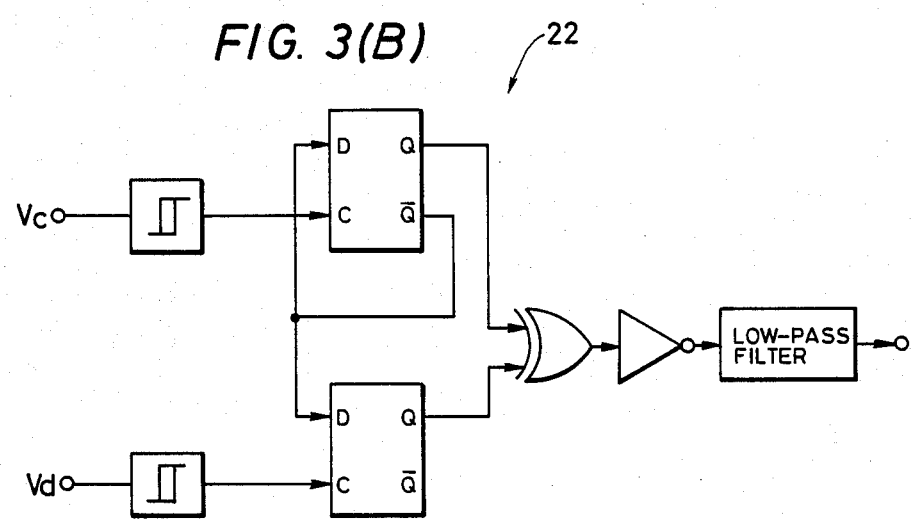
Figure 3C:
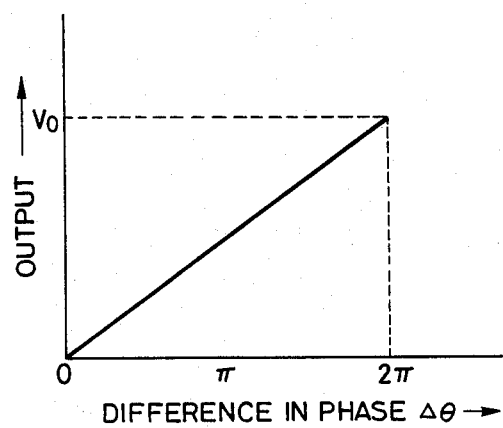

A PSK modulating signal having a carrier angular frequency of $\Omega$ S is mixed with a signal having a carrier angular frequency of $\Omega$ L provided by the VCO 1, to obtain a signal having an intermediate carrier angular frequency $\Omega$. The signal thus obtained is applied to the band-pass filter 3, where noise components, etc. are removed therefrom. The output of the filter 3 is amplified by the amplifier 4 to a predetermined level. The output signal of the amplifier 4 is converted into a square wave signal by the Schmitt trigger circuit 5, which is supplied to the phase detection circuit 6 to obtain the original digital data. The phase detection circuit may be the delay detection circuit illustrated in FIGS. 3A, 3B and 3C.

A part of the output signal of the Schmitt trigger circuit is supplied through the gate circuit 7 to the pulse counter 8, so that pulses are counted for a predetermined period of time. The resultant count value is read by the pulse count number reading circuit 9 and is stored in the pulse count number memory 10. The difference between the count number stored in the memory 10 and the reference pulse number memory 14 is calculated by the subtraction circuit 11. The difference is converted into analog data by the D/A converter 12, which is supplied to the low-pass filter 13 so that the digital error is smoothed. The output of the filter 13 is supplied to the VCO 1, as a result of which the oscillation frequency of the VCO is so controlled that the difference between the two count numbers is zero (0).

Thus, the intermediate carrier angular frequency provided by the mixer 2 can be stabilized to a predetermined angular frequency.

The above-described control may be modified as follows: After the count value of the pulse counter 8 is read, the content of the latter 8 is reset, and the gate circuit is opened. This operation is repeatedly carried out, so that the content of the pulse count number memory 10 is renewed at each operation, whereby the intermediate carrier angular frequency is continuously stabilized.

The PSK modulation wave with the intermediate carrier angular frequency thus stabilized is applied to the phase detection circuit 6. Therefore, the phase detection can be stability achieved without decreasing the value $\Delta T$.

In the above-described embodiment, the phase detection is carried out with the intermediate carrier angular frequency stabilized. Therefore, the data $\Delta T$ can be set to a relatively large value, and the occupied frequency bandwidth of the modulation wave can be decreased. In addition, it is possible to eliminate high frequency components also a subsequent signal, e.g., video, processing stage after the detection. This will permit an increase in the degree of design freedom and improve economic operation.

Since, as is apparent from the above description, digital circuits can be employed, it is possible to provide the whole system in the form of an integrated circuit.

As is evident from the foregoing, in the demodulation of the invention, after the signal is received which has been so phase-modulated that the time average value of the frequencies is equal to the carrier frequency, the received signal is mixed with the output signal of the variable frequency local oscillator in a digital-feedback-loop to obtain the intermediate frequency signal with the intermediate carrier frequency stabilized. Therefore, the original digital signal can be obtained readily and accurately without being affected by carrier frequency variations. In addition, the occurrence of product errors can be prevented.

This invention is not limited to the above-described embodiment. The invention can demodulate a signal which has been phase-modulated in such a manner that, for instance, the phase change part is formed when the transmission signal is in one of the "mark" and "space" states, and only the reference phase part is formed when it is in the other state. It will be obvious to those skilled in the art that various changes and modifications may be made in the embodiment without departing from the invention. Accordingly, the invention is not limited by the foregoing description, but is only limited by the scope of the appended claims.

What is claimed is:

1. A phase shift keying demodulator comprising:
   a mixer receiving: (1) a signal which is phase-modulated by a digital signal such that a time average of its frequency is equal to a carrier frequency thereof, and (2) an output signal of a variable frequency local oscillator;
   a waveform conversion circuit for converting an intermediate frequency signal of said mixer to a square wave signal;
   a pulse counter for counting said square wave signal for every period of time which is n times a time slot of said digital signal;
   a subtraction circuit for receiving a count number from said pulse counter, and providing the difference between said counter number and a reference count number;
   a digital-to-analog converter for converting a difference signal provided by said subtraction circuit into an analog signal which is supplied to said variable frequency local oscillator; and
   means for receiving said square wave signal and providing therefrom a signal representative of said digital signal.

2. A demodulator as claimed in claim 1 wherein n is an integer.

3. A demodulator as claimed in claim 1 wherein n is a sufficiently larger number other than an integer.

4. A demodulator as claimed in claim 1 wherein said means for receiving and providing is a phase detector.

5. A demodulator as claimed in claim 4 wherein said phase detector comprises means for delaying said square wave signal from said conversion circuit to form a delayed version of said square wave signal, and means for comparing said square wave signal from said conversion circuit with said delayed version of said square wave signal to produce said representative signal.

6. A demodulator as claimed in claim 1, in which said signal which is phase-modulated by a digital signal is phase-modulated in such a manner that:
   reference phase parts, the total time of which is a predetermined value, are provided at the front and/or rear part of a time slot thereof, and in the front half of the remaining part of said time slot, the phase of the modulated signal is changed in a predetermined direction in correspondence to one of "mark" and "space" state, while in the rear half of the remaining part, said phase thus changed is returned to a reference value, and is further changed in a direction opposite to said predetermined direction in correspondence to the other of said "mark" and "space" state.

7. A demodulator as claimed in claim 1, in which said signal which is phase-modulated by a digital signal is phase-modulated in such a manner that:
   reference phase parts, the total time of which is a predetermined value, are provided at the front and/or rear part of a time slot thereof, and in the front half of the remaining part of said time slot, the phase of the modulated signal is changed in a predetermined direction in correspondence to one of "mark" and "space" state, while in the rear half of the remaining part, said phase thus changed is returned to a reference value, and said phase remains at said reference value in correspondence to the other of said "mark" and "space" state.

* * * * *